United States Patent Office 3,404,747
Patented Oct. 8, 1968

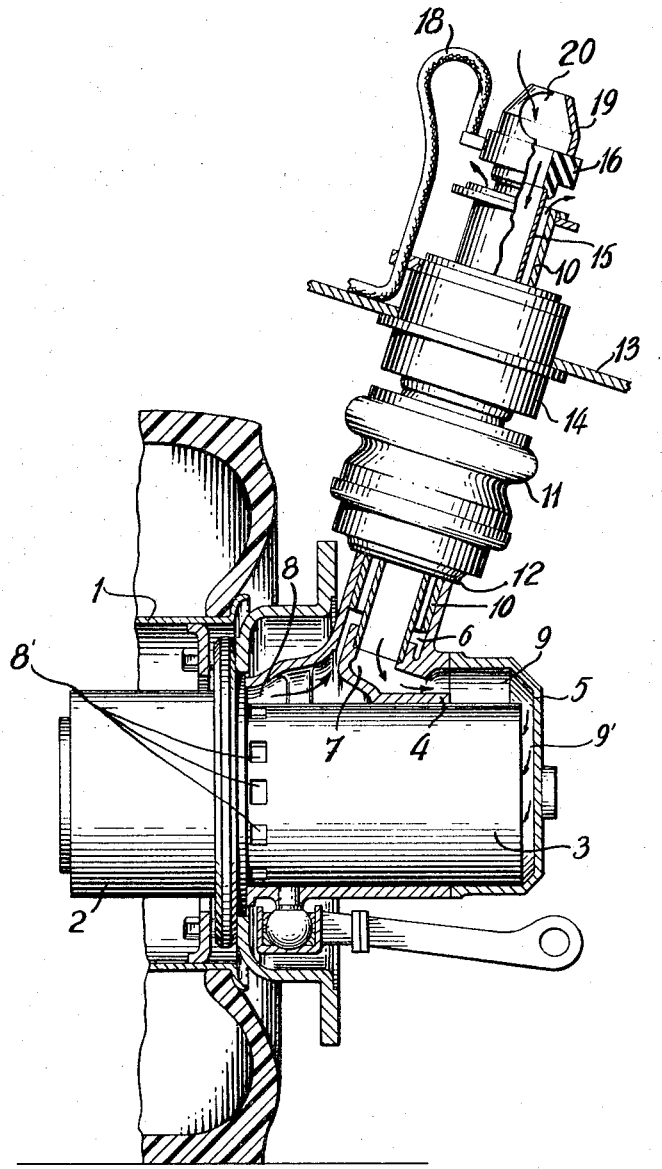

3,404,747
ELECTRICAL STEERING WHEEL WITH INDEPENDENT SUSPENSION
Roger Fagel, Marcinelle, Belgium, assignor to Ateliers de Constructions Electriques de Charleroi (ACEC) Societe Anonyme, Charleroi, Belgium
Filed Dec. 5, 1966, Ser. No. 599,066
Claims priority, application Belgium, Dec. 7, 1965, 673,359
2 Claims. (Cl. 180—43)

ABSTRACT OF THE DISCLOSURE

A steering wheel with leakproof suspension wherein the driving motor is mounted on the rim of the wheel and is coaxial therewith. A yoke surrounds the driving motor and forms therewith a pair of leakproof chambers in respective communication with the air suction and delivery openings of the motor. A pair of concentric tubes are each connected at one end to one of the chambers and open, at the other end into the vehicle body. A pneumatic sleeve surrounds the concentric tubes and is connected at one end to the vehicle body and at the other end to the outer tube at its connection to the yoke.

---

The instant invention relates to automotive vehicles with powered steering wheels provided with independent electrical motors. It is an object of the invention to provide a steering wheel with an entirely leak proof independent suspension particularly adapted for all-ground or amphibious vehicles.

The steering wheel according to the invention comprises an electrical motor associated with a speed reducer housed within its rim, the motor casing supporting the vehicle body frame through a suspension column inclined in relation to the axis of the wheel and is characterized in that the motor casing is secured in a yoke and is surrounded by a sheath solid with said yoke, the sheath having two tubular concentric orifices respectively opening into two chambers of the said sheath, the chamber connected to the central tubular orifice communicating with the ventilation air inlet of the motor whereas the other communicates with the ventilation air outlet of the said motor, the suspension column comprising a tube, nested and secured in the outer tubular orifice, supporting the vehicle body frame through a pneumatic suspension, the said tube, on the other hand, opening inwardly of the vehicle and containing another concentric tube nested in the central tubular orifice of the motor sheath and connected, on the other hand, inwardly of the vehicle, to a fresh air intake, the latter tube containing also the power lines of the motor.

According to another feature of the invention, the pneumatic suspension member consists of an air cushion through which the tube of the suspension column extends resting by means of a base plate on the periphery of the outer tubular orifice of the motor sheath.

The description that follows and the appended drawing relate to a particular embodiment of the invention. The single figure is a partial cross-sectional view of a steering wheel comprising a rim 1 driven by an electrical motor 3 through a coaxial reducer 2. The motor casing itself is secured, by means of a tangential key for instance or by any other appropriate means not illustrated, in a yoke 4 which is part of a housing or sheath 5 fluid tightly connected to the case of the reducer 2. This housing has two tubular concentric orifices 6 and 7 respectively an air outlet and an air inlet orifice, said orifices opening into two chambers, respectively 8 and 9 of housing 5. Chamber 8 communicates with the outlet or air delivery opening 8' of the air ventilator of the motor and the chamber 9 with the inlet thereof or air suction opening 9'. The suspension column comprises a tube 10 nested into the tubular orifice 6 of the housing 5 and fixed thereto by any known means; this tube crosses the resilient suspension member made up of an air cushion on sleeve 11 resting, through a base plate 12, on the periphery of the outer tubular orifice 6 and supporting, at the upper end thereof, the frame 13 of the vehicle through a knuckle 14 capable of sliding along tube 10. Cushion 11 is made leakproof in relation to tube 10 against air pressure by any known means, not shown.

Tube 10 opens at the upper end inside the vehicle and contains a concentric tube 15 nested at the lower end in the tubular orifice 7 of the housing 5 of the motor and provided, at the upper end, with an insulating collar 16 acting as support for the input terminals 17 of the voltage feeding the motor by cables 18, collar 16 having a cap 19 adapted to be connected, through an orifice 20, to a fresh air intake. Terminals 17 are connected to the feed terminals of the motor 3 by conductors arranged within tube 15 and not shown for greater clarity.

As indicated by the arrows on the figure, the air drawn in by the ventilator of motor 3 enters orifice 20 in the tube 15, goes in chamber 9 of the housing 5, through the motor and enters into chamber 8 where it is drawn out and driven inside the vehicle by the annular channel comprised between tubes 10 and 15. The ventilation of the motor is thus always ensured even if the wheel is completely immersed in water.

It is of course possible to make various changes to the steering wheel with independent suspension described above without departing from the spirit of the present invention.

I claim:
1. In a motor vehicle having a body and a steering wheel provided with a rim, the combination comprising:
  (a) a speed reducer mounted in said rim;
  (b) a driving motor coaxially mounted on said reducer; said motor having a casing, an air delivery opening at one end of said casing adjacent said rim and an air suction opening at the other end thereof;
  (c) a yoke mounted on said casing;
  (d) said yoke formed with a sheath fluid tightly connected to said reducer and fully enclosing said motor; said sheath defining with said yoke and said casing a first chamber in communication with said air delivery opening and a second chamber in communication with said air suction opening;
  (e) said yoke and sheath defining an air inlet orifice in communication with said second chamber, and an air outlet orifice in communication with said first chamber; said outlet orifice surrounding said inlet orifice coaxially therewith;
  (f) a first tube secured at one end to said air outlet orifice and opening at the other end, into said vehicle body, and
  (g) a second tube, within said first tube, connected at one end to said air inlet orifice and opening, at the other end, into said vehicle body.
2. A combination as claimed in claim 1 including a pneumatic sleeve over said first tube and connected, at one end to said vehicle body and, at the other end, to said first tube.

References Cited

UNITED STATES PATENTS

| | | | |
|---|---|---|---|
| 2,720,274 | 10/1955 | Blomquist | 180—60 |
| 3,161,249 | 12/1964 | Bouladon | 180—65 X |
| 3,163,250 | 12/1964 | Gibson | 180—43 |

A. HARRY LEVY, *Primary Examiner.*